United States Patent
Minelli et al.

(10) Patent No.: US 6,663,064 B1
(45) Date of Patent: Dec. 16, 2003

(54) MULTI-POSITION ARTICULATING MOUNTING APPARATUS FOR AN ELECTRONIC DEVICE

(75) Inventors: Jeffrey D. Minelli, Olathe, KS (US); Dale R. Langner, Overland Park, KS (US); Brian Schoenfish, Kansas City, KS (US); John B. Whiteside, Lenexa, KS (US)

(73) Assignee: Garmin Corporation (TW)

( * ) Notice: Subject to any disclaimer, the term of this patent is extended or adjusted under 35 U.S.C. 154(b) by 245 days.

(21) Appl. No.: 09/840,949

(22) Filed: Apr. 24, 2001

Related U.S. Application Data

(63) Continuation of application No. 09/452,409, filed on Dec. 1, 1999.

(51) Int. Cl.[7] ............................................. F16B 47/00
(52) U.S. Cl. ............................. 248/205.5; 248/187.1; 248/284.1; 248/415; 248/309.3
(58) Field of Search ................................ 248/183.1, 183.2, 248/183.3, 186.2, 187.1, 284.1, 291.1, 292.12, 415, 920, 923, 205.5, 206.2, 205.8, 205.7, 467, 537, 309.3, 362, 363

(56) References Cited

U.S. PATENT DOCUMENTS

| | | | |
|---|---|---|---|
| 1,147,102 A | 7/1915 | Knabe | 248/205.7 |
| 1,266,367 A | 5/1918 | Wilson | |
| 1,638,716 A | 8/1927 | Surles | |
| 1,722,678 A * | 7/1929 | Peterson | 248/583 |
| 1,877,570 A | 9/1932 | Fitzgerald | 211/69.7 |
| 1,995,656 A | 3/1935 | Stout | 248/19 |
| 2,174,209 A * | 9/1939 | Genest et al. | 248/561 |
| 2,222,724 A * | 11/1940 | Rogers | 248/624 |
| 2,319,726 A | 5/1943 | Duggan | 16/86 A |
| 2,371,451 A | 3/1945 | Larson | 248/226 |
| 2,528,201 A | 10/1950 | White | 248/226 |
| 2,720,372 A | 10/1955 | Gowan | 248/186 |
| 2,900,757 A | 8/1959 | Grimm | 15/257.05 |
| 2,940,713 A | 6/1960 | Van Dusen | 248/205.1 |
| 3,126,191 A | 3/1964 | Holden | 248/286 |
| 3,142,934 A | 8/1964 | Mehling | 215/377 |
| 3,312,436 A | 4/1967 | Beghetto, Jr. | 248/148 |
| 3,747,170 A | 7/1973 | Kieves | 24/523 |
| 4,133,575 A | 1/1979 | Mader | 248/205.8 |
| 4,162,696 A | 7/1979 | Sprung | 150/52 J |
| 4,270,721 A | 6/1981 | Mainor, Jr. | 248/285 |
| 4,592,526 A | 6/1986 | Kobelt | 248/278 |
| 4,687,167 A | 8/1987 | Skalka et al. | 248/278 |
| 4,760,987 A | 8/1988 | Lan | 248/346.11 |
| 4,797,916 A | 1/1989 | Kojima | 379/454 |

(List continued on next page.)

Primary Examiner—Kimberly Wood
Assistant Examiner—Naschica S. Morrison
(74) Attorney, Agent, or Firm—Devon A. Rolf

(57) ABSTRACT

An apparatus is provided for removably mounting an electronic device to a surface and for positioning the device with respect to the surface. The apparatus includes a cradle securable to the electronic device and a pivot link, which has a first end and a second end. The first end being pivotally coupled to the cradle. The apparatus also includes a support having a mounting pedestal coupled thereto. The second end of the pivot link is pivotally coupled to the support. The apparatus has a base which has a lower face that can be coupled to the surface and an upper face. The upper face has a receiving slot for the pedestal, the slot having a shoulder extending thereabove to engage the pedestal. The slot further has an open end to allow the pedestal to be moved within the slot. The base further includes a releasable locking arm having a retaining ridge located in line with the open end of the slot to selectively hold the pedestal within the slot. The pedestal of the apparatus can be placed within the slot and held within the slot by the retaining ridge of the locking arm. Further, the electronic device can be positioned with respect to the surface by pivoting the cradle and the link, and by rotating the pedestal within the slot. In an alternate embodiment, a suction cup mount is utilized.

7 Claims, 8 Drawing Sheets

U.S. PATENT DOCUMENTS

| | | | | |
|---|---|---|---|---|
| 4,834,329 A | | 5/1989 | Delapp | 248/183 |
| 4,852,926 A | | 8/1989 | Littell | 248/363 |
| 4,956,756 A | | 9/1990 | Hsiao | 362/226 |
| D312,650 S | | 12/1990 | Charrier | D16/242 |
| D314,713 S | | 2/1991 | Ciranny et al. | D10/65 |
| 4,989,813 A | | 2/1991 | Kim et al. | 248/183 |
| 5,013,075 A | | 5/1991 | Littell | 248/363 |
| 5,065,973 A | | 11/1991 | Wang | 248/205.8 |
| 5,087,005 A | | 2/1992 | Holoff et al. | 248/205.8 |
| 5,092,552 A | | 3/1992 | Dayton et al. | 248/280.1 |
| 5,104,077 A | * | 4/1992 | Liu | 248/205.8 |
| 5,123,621 A | | 6/1992 | Gates | 248/281.1 |
| 5,154,390 A | | 10/1992 | Bain et al. | 248/447.2 |
| 5,204,817 A | | 4/1993 | Yoshida | 364/449 |
| 5,263,423 A | | 11/1993 | Anderson | 108/43 |
| 5,263,593 A | * | 11/1993 | Aida | 211/69.1 |
| 5,263,760 A | * | 11/1993 | Sohol | 248/205.9 |
| 5,323,996 A | * | 6/1994 | Rendall | 248/205.3 |
| 5,326,059 A | | 7/1994 | Pryor et al. | 248/231.7 |
| 5,332,185 A | | 7/1994 | Walker, III | 248/346 |
| 5,337,985 A | | 8/1994 | Hale | 2348/174 |
| 5,339,222 A | | 8/1994 | Simmons et al. | 361/818 |
| 5,350,147 A | | 9/1994 | Paganus | 248/346 |
| 5,366,129 A | * | 11/1994 | Nakamura et al. | 225/42 |
| 5,381,990 A | * | 1/1995 | Belokin et al. | 248/205.9 |
| 5,405,112 A | * | 4/1995 | Trethewey | 248/205.8 |
| 5,411,230 A | * | 5/1995 | Messinger | 248/205.8 |
| 5,429,336 A | | 7/1995 | Ko | 248/278 |
| 5,476,241 A | | 12/1995 | Helman | 248/286.1 |
| 5,503,361 A | | 4/1996 | Kan-O et al. | 248/688 |
| 5,655,736 A | | 8/1997 | Kozloff et al. | 248/179.1 |
| 5,820,116 A | * | 10/1998 | Haese | 248/205.8 |
| 5,842,671 A | * | 12/1998 | Gibbs | 248/231.41 |
| 5,918,841 A | | 7/1999 | Sweere et al. | 248/123.11 |
| 5,924,665 A | | 7/1999 | Sweere et al. | 248/285.1 |
| 5,931,102 A | | 8/1999 | Grahl | 108/42 |
| 5,938,159 A | | 8/1999 | Hung | 248/278.1 |
| 5,964,443 A | | 10/1999 | Leveille | 248/478 |
| 5,967,479 A | | 10/1999 | Sweere et al. | 248/280.11 |
| 5,975,474 A | | 11/1999 | Kaplan et al. | 248/289.11 |
| 5,996,954 A | | 12/1999 | Rosen et al. | 248/278.1 |
| 6,012,693 A | | 1/2000 | Voeller et al. | 248/280.11 |
| 6,027,257 A | | 2/2000 | Richards et al. | 396/428 |
| 6,045,111 A | * | 4/2000 | Hsieh | 248/205.8 |
| 6,047,939 A | | 4/2000 | Kim | 248/371 |
| 6,050,535 A | | 4/2000 | Kang | 2148/371 |
| 6,079,682 A | | 6/2000 | Olkkola | 248/278.1 |
| 6,089,520 A | | 7/2000 | Wu et al. | 248/371 |
| 6,129,321 A | | 10/2000 | Minelli et al. | 248/183.1 |
| 6,213,438 B1 | | 4/2001 | Ostby et al. | 248/276.1 |
| 6,464,185 B1 | * | 10/2002 | Minelli et al. | 248/183.1 |

* cited by examiner

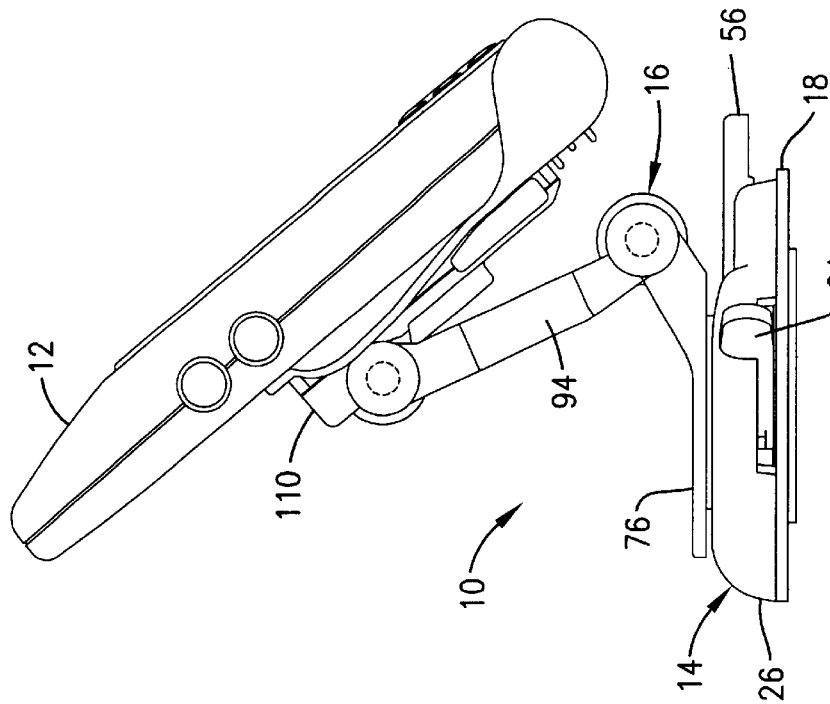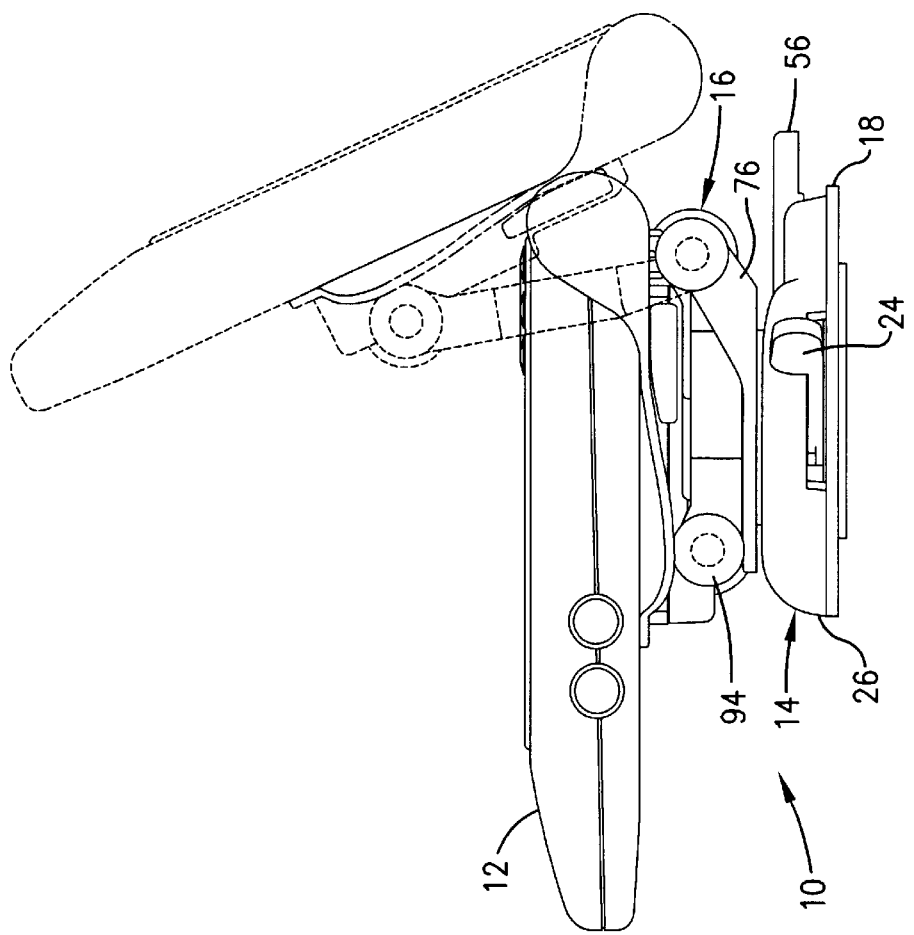

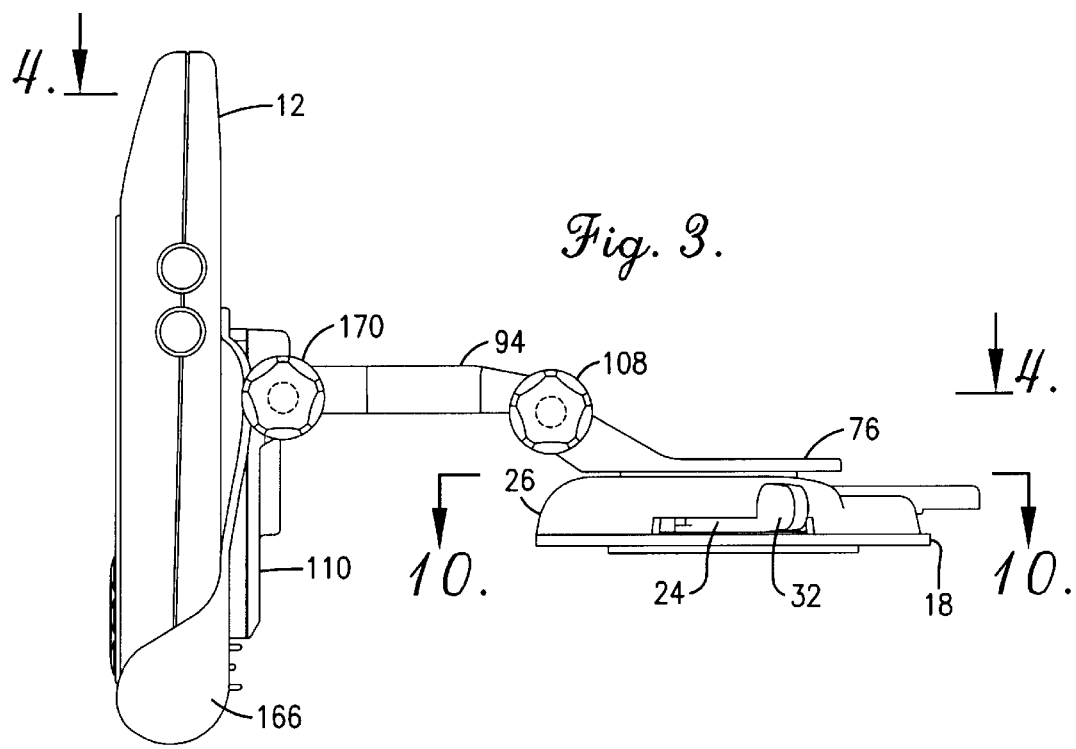
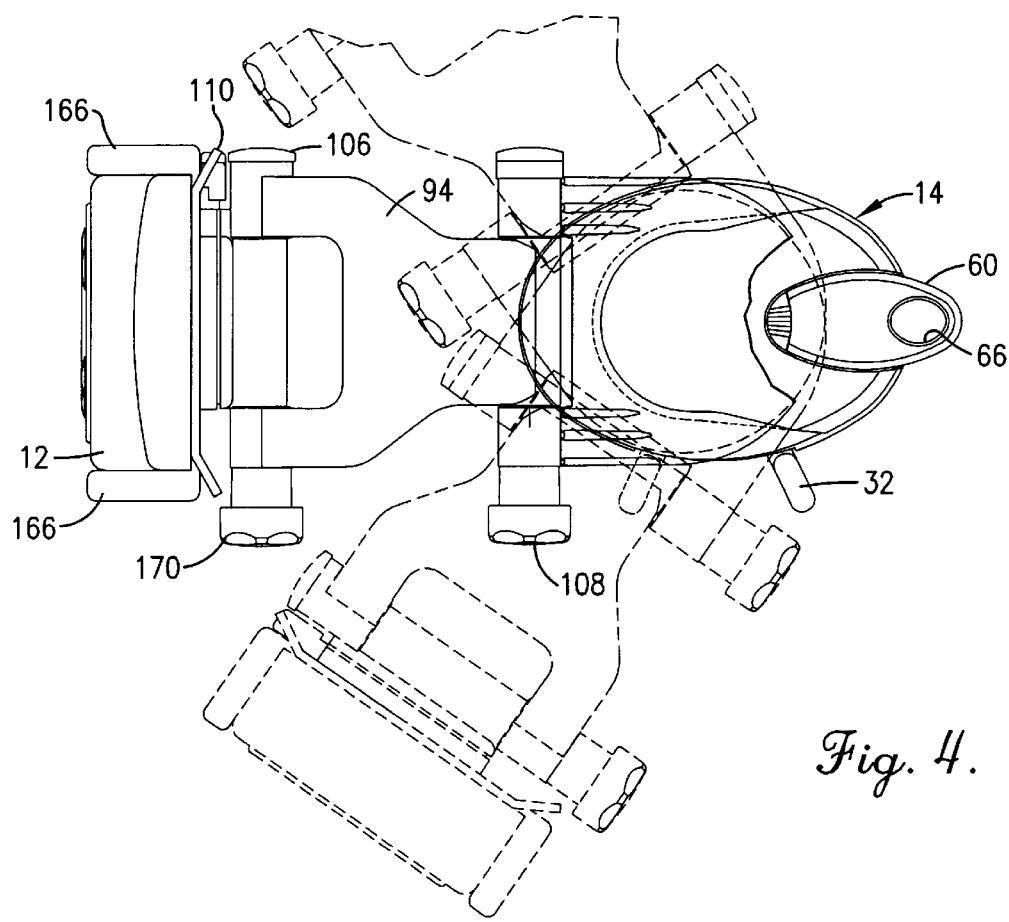

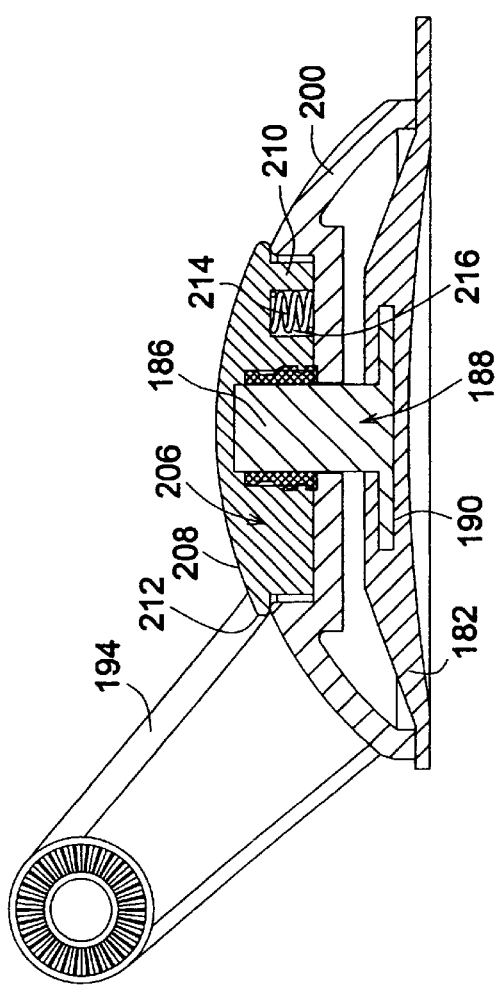
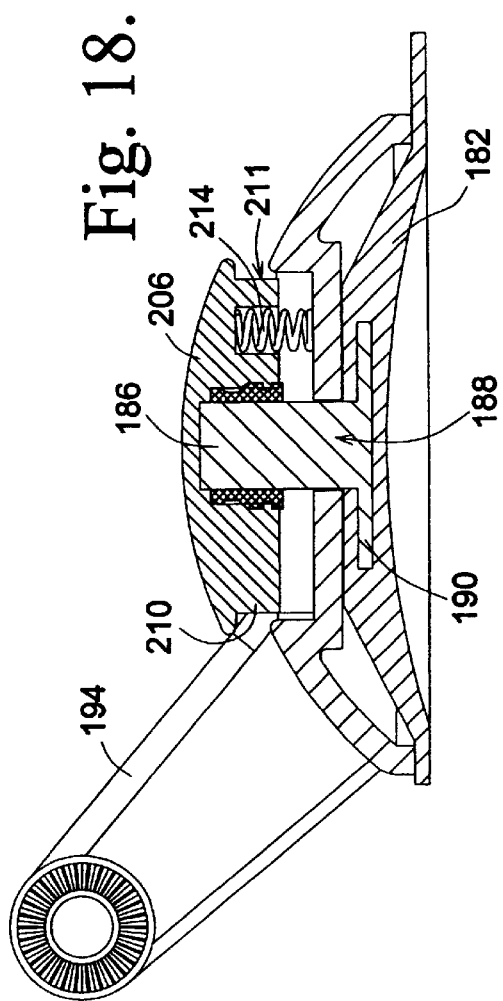

MULTI-POSITION ARTICULATING MOUNTING APPARATUS FOR AN ELECTRONIC DEVICE

This application is a continuation of Ser. No. 09/452,409, filed Dec. 1, 1999 to the same inventors, entitled "Multi-Position Articulating Mounting Apparatus for an Electronic Device".

BACKGROUND OF THE INVENTION

1. Field of the Invention

The present invention relates to a mounting apparatus for an electronic device. More specifically, the invention relates to a mounting apparatus for an electronic device for use in a vehicle, which allows the electronic device to be selectively rotated and placed in a number of positions, and which allows the electronic device to be placed within, and removed from, a mounted position with one hand.

2. Description of the Related Art

Electronic devices are being used more and more frequently in vehicles. For example, global positioning satellite devices are currently being used in vehicles and elsewhere. These devices are used for navigational purposes and are either permanently installed in a vehicle, or mounted so as to be portable. Further, these devices have a screen which visibly communicates information to the user thereof. The portable device is advantageous in that it can be taken from the vehicle and used outside of the vehicle, thus adding value to the device.

The mounting of portable devices within vehicles does, however, present a number of disadvantages. First, it is more difficult to mount a portable device in a location within the vehicle that allows its screen to be easily viewed. Devices that are permanently installed in the vehicle can be mounted within the dashboard of the vehicle, easily within sight of the vehicle driver or passenger. Portable devices must, however, be mounted somewhere within the interior of the vehicle, such as on top of the dashboard. This mounting position presents the challenge of mounting the device in an orientation and position that can be seen and accessed.

Viewing the screen of a portable electronic device can be hampered if the angle of the viewing screen is fixed relative to the surface on which the device is mounted. A fixed viewing angle may limit the vehicles on which the device can be effectively mounted due to varying dashboard configurations as well as varying driver and passenger heights. In other words, a fixed viewing angle may impair the user's ability to effectively and comfortably view the screen. Second, these electronic devices are often under-utilized if they are only viewable by the driver of the vehicle, but not passengers riding therein. Often the passenger in the vehicle is acting as the navigator. In these situations, it is advantageous for the passenger to be able to view the global positioning satellite device.

Third, depending on the configuration of the dashboard surface on which the device is mounted, it may be necessary to either elevate or lower the device with respect to the mounting surface in order to get a clearer view of the device. A rigid mounting apparatus that does not offer the ability to manipulate the orientation of the device relative to the mounting surface is therefore disadvantageous.

As may be appreciated, it would also be advantageous to be able to place the electronic device into a mounted position using only one hand. Similarly, it would be advantageous to remove the electronic device from a mounted position using only one hand.

Therefore, a mounting apparatus is needed that can be used to mount a portable electronic device within a vehicle so that the device can be easily viewed and adjusted. Further, a mounting apparatus is needed that allows an electronic device to be mounted within a vehicle so that it is viewable by either the driver or the passenger riding therein. Still further, a mounting apparatus is needed that allows an electronic device to be mounted within, and removed from, a mounted position using only one hand. Finally, a mounting apparatus is needed that can be used to either elevate or lower, and manipulate the orientation of the device relative to the surface on which the apparatus is mounted.

SUMMARY OF THE INVENTION

It is an object of the present invention to provide a mounting apparatus for an electronic device within a vehicle so that the device can be easily viewed and that allows the angle of the device relative to the user to be adjusted.

It is a further object of this invention to provide a mounting apparatus that selectively allows either the driver or the passenger of a vehicle in which the device is mounted to view the device.

It is another feature of this invention to provide a mounting apparatus that allows a device mounted therein to be either raised or lowered, and manipulated relative to the surface on which the apparatus is mounted.

It is still another object of the present invention to provide a mounting apparatus for an electronic device that allows the electronic device to be mounted within, and removed from, a mounted position using only one hand.

According to the present invention, the foregoing and other objects are obtained by an apparatus for removably mounting an electronic device to a surface and for positioning the device with respect to the surface. The apparatus includes a cradle that is adapted to be releasably secured to the electronic device and a pivot link, which has a first end and a second end. The first end being pivotally coupled to the cradle. The apparatus also includes a support having a mounting pedestal coupled thereto. The second end of the pivot link is pivotally coupled to the support. The apparatus has a base which has a lower face that can be coupled to the surface and an upper face. The upper face has a receiving slot for the pedestal, the slot having a shoulder extending thereabove to engage the pedestal. The slot further has an open end to allow the pedestal to be moved within the slot. The base further includes a releasable locking arm having a retaining ridge located in line with the open end of the slot to selectively hold the pedestal within the slot. The pedestal of the apparatus can be placed within the slot and held within the slot by the retaining ridge of the locking arm. Further, the electronic device can be positioned with respect to the surface by pivoting the cradle and the link, and by rotating the pedestal within the slot.

In an alternative embodiment of the present invention, an alternate base portion of the mounting bracket is employed. In particular, the base portion of this alternate embodiment is a suction cup mount. The suction cup mount has a housing which includes upwardly, angularly extending arms for connection to the linkage, which in turn is connected to the cradle into which an electronic device is secured. A flexible suction cup has a plunger molded therein, such that a portion of the plunger is potted into the flexible suction cup during formation of the suction cup, and a post of the plunger extends upwardly from the suction cup. The upwardly extending suction cup extends through an aperture proximate the center of the housing, such that the housing is placed at least substantially over the suction cup. An upper end of the post is threaded, and a correspondingly threaded cap is screwed onto the post, thereby assembling the suction cup mount. Additionally, in accordance with a preferred aspect of the present invention, one or more springs are placed in recesses beneath the cap, and are thus positioned between the housing and the cap.

Accordingly, the suction cup mount may be utilized to mount the mounting apparatus on a surface, such as a vehicle window or dashboard, or any other suitable surface. In use, the suction cup mount is located on a surface, and the cap is pressed downwardly, thus causing the connected plunger to push the suction cup downwardly onto the surface and create a vacuum mount. In such a position, the cap engages an upper portion of the housing. Particularly, when the suction cup is in its fully seated position, and the cap is thus resting on a top portion of the housing of the mount, a peripheral rim portion of the cap is preferably hidden by a peripheral wall of a recess in the upper portion of the housing. Additionally, the one or more springs provided between the upper portion of the housing and the cap bias the cap upwardly, thus placing an upward force on the cap, the plunger, and the suction cup. This upward force assists in retaining the suction cup in a seated position. As the suction cup begins to lose its vacuum mount, a central portion of the suction cup will begin to rise upwardly as its outer edges draw inwardly. Accordingly, the post of the plunger, which is positioned proximate the center of the suction cup, correspondingly begins to move upwardly, thus also causing the cap to move upwardly from its seated position on the top of the housing. In accordance with the preferred aspect of the invention, the peripheral rim portion of the cap is preferably marked or colored differently from the remainder of the mount, such that as the cap moves upwardly, a user can readily visually discern the fact that the cap is moving upwardly, and that the suction cup requires reseating.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE DRAWINGS

The objects and features of the invention noted above are explained in more detail with reference to the drawings, in which like reference numerals denote like elements, and in which:

In the accompanying drawings which form a part of the specification and which are to be read in conjunction therewith and in which like reference numerals are used to indicate like parts in the various views:

FIG. 1 is a side elevation view of the mounting apparatus according to the present invention, with a different orientation being shown in phantom lines;

FIG. 2 is a side elevation view similar to FIG. 1, showing the mounting bracket in a different orientation;

FIG. 3 is another side elevation view of the mounting device shown with the mounting bracket rotated and in an extended position;

FIG. 4 is a view taken along line 4—4 of FIG. 3 with different rotational orientations shown in phantom lines;

FIG. 17 is a cross-sectional view illustrating the alternate base portion of the mounting bracket of the present invention in a fully seated position; and FIG. 18 is a cross-sectional view of the alternate base portion of the mounting bracket of the present invention, wherein the base portion requires reseating.

DETAILED DESCRIPTION OF THE INVENTION

Figure 5:
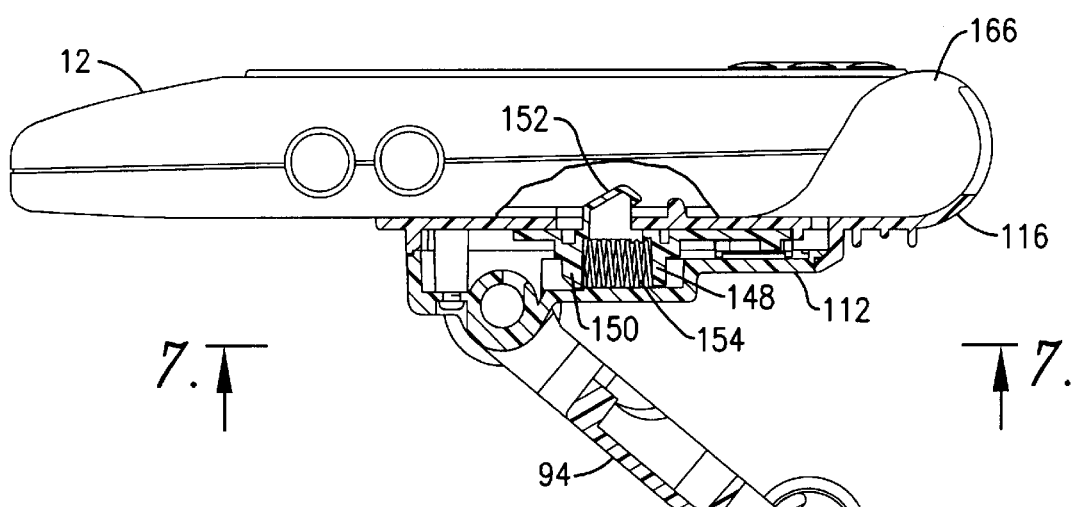
FIG. 5 is a cross-sectional view of the mounting device shown with an electronic device mounted therein and parts being broken away to show particular details of construction.

Referring initially to FIGS. 1 and 2, a mounting apparatus embodying the principles of this invention is broadly designated in the drawings by reference numeral 10. Apparatus 10 is used to hold an electronic device 12 on a surface, such as a vehicle dash. Electronic device 12 can be, for example, a global positioning satellite device. Such a device normally includes some type of viewing screen, which visually conveys information to the user of the device. Apparatus 10 includes a base 14 and a mounting bracket 16. As described below, base 14 is coupled to the desired surface and is used to releasably hold mounting bracket 16. Bracket 16 is releasably coupled to the electronic device and is constructed to be releasably held within base 14.

Figure 10:
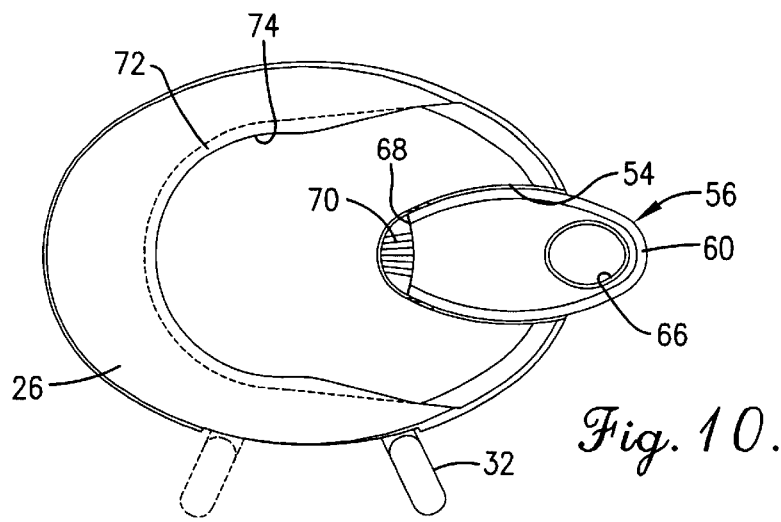
FIG. 10 is a view taken along line 10—10 of FIG. 3.
Figure 11:
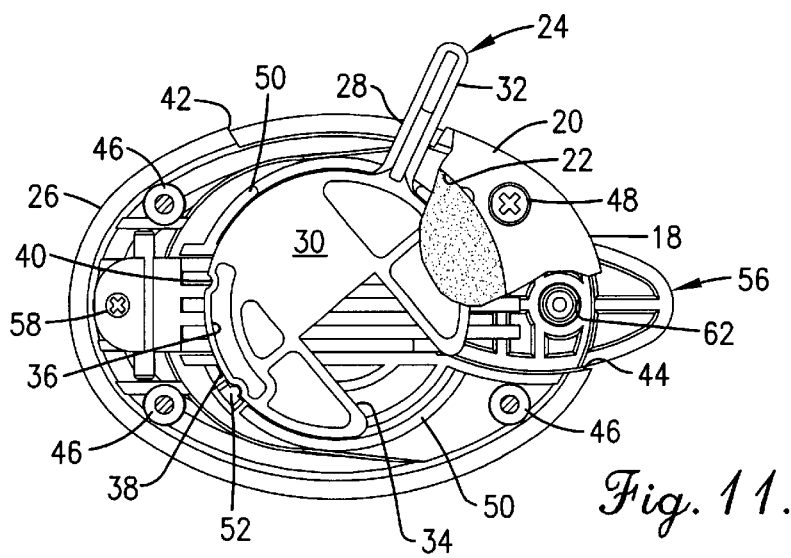
FIG. 11 is a bottom view of the base shown in FIG. 10, with parts being broken away to show particular details of construction.
Figure 12:
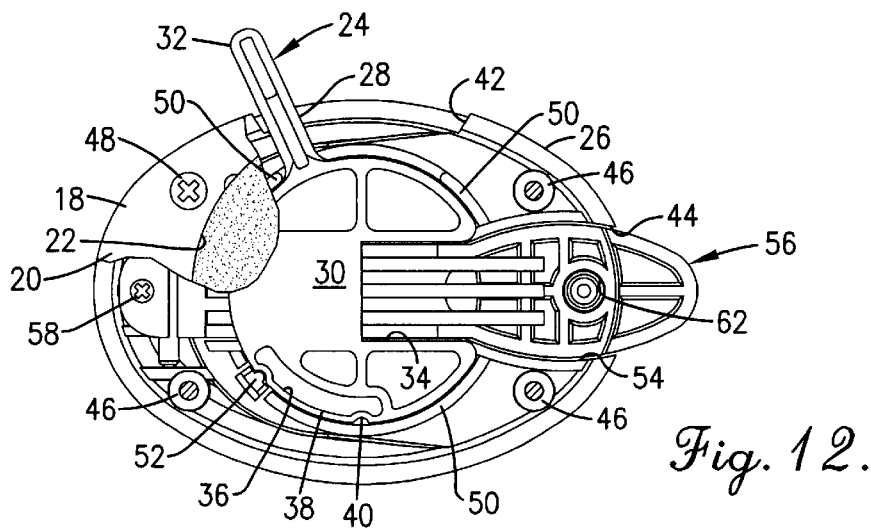
FIG. 12 is a view similar to FIG. 11 showing the locking tab in a different orientation.

Base 14 is constructed and assembled as described in a co-pending patent application, filed Nov. 16, 1998 entitled Mounting Apparatus For An Electronic Device, the specification of which is hereby incorporated by reference. As best seen in FIGS. 10–12, base 14 has a lower section 18 with an exterior surface 20, which has an inset 22 formed therein. Inset 22 is used to attach exterior surface 20 to the desired surface, such as a vehicle dash. In use, an adhesive material may be applied within inset 22, which can then be placed on the desired surface. Alternatively, a suitable adhesive putty may be used to attach base 14 to the desired surface, with inset 22 controlling the location of the putty.

Base 14 further has a locking tab 24 held between lower section 18 and an upper section 26. Tab 24 has an outwardly extending handle 28 that is connected to an operative key section 30. Preferably, handle 28 and key section 30 are integrally formed from one piece. Handle 28 may be equipped with an enlarged head 32 for easier grasping by the user thereof. Key section 30 has a unshaped slot 34 formed therein which is used to either prevent or allow bracket 16 to be removed from base 14, as is more fully described below. Located about one portion of the outer perimeter of key section 30 is an arcuate slot 36. As best seen in FIGS. 11 and 12, the outermost wall 38 defining slot 36 is relatively thin and has a depression 40 formed in each end thereof.

Upper section 26 has a first gap 42 and a second gap 44 formed therein. First gap 42 allows clearance for handle 28 of locking tab 24, and allows clearance for rotational movement of handle 28 about an axis in the center of key section 30. Second gap 44 allows clearance for a locking arm, as is more fully described below. Located within upper section 26 are a number of threaded columns 46. A screw 48 is placed through lower section 18 and is threaded into each column 46, thereby securing lower section 18 to upper section 26.

Also located within the interior of upper section 26 is a series of arcuate retaining walls 50. As best seen in FIGS. 11 and 12, there are preferably three walls 50, with one wall being longer than the other two. Walls 50 are located to form a perimeter that is slightly larger that the outer perimeter of key section 30, and act to retain key section 30 within walls 50. The two shorter walls 50 are spaced from one another to allow clearance for handle 28, and to allow clearance for rotational movement of the handle. Generally, the two shorter walls 50 are spaced a corresponding distance to match the size of first gap 42. The space between each of the shorter walls 50 and longer wall 50 allows clearance for a locking arm, as is more fully described below. Longer wall 50 has a detent 52 formed therein. Detent 52 is flexibly mounted within upper section 26, so that it can move toward and away from locking tab 24. In use, as is more fully described below, detent 52 is located within one of the two depressions 40 to hold locking tab 24 in either an open or a closed position. Upper section 26 further has a c-shaped cut-out 54 extending therethrough. Cut-out 54 is generally located between one of the shorter walls 50 and the longer wall 50. Cut-out 54 allows clearance for a locking arm 56.

Locking arm 56 is secured within upper section 26 at a location distal from second gap 44. Arm 56 is secured to upper section 26 with a suitable attaching mechanism, such as a screw or rivet, as shown at 58. Other suitable attaching mechanisms could be used, so long as one end of arm 56 is secured to upper section 26. Arm 56 has an elongated portion terminating at a button 60. The elongated portion has a width that is slightly less than the width of slot 34 in key section 30, so that it may pass between slot 34, when slot 34 is in alignment with arm 56. Button 60 is shaped to fit within cut-out 54 so that it may travel within the cut-out, and is sized to extend beyond the perimeter of upper section 26. As best seen in FIG. 12, button 60 is preferably generally oval in shape and has a spring chamber 62 formed in the bottom thereof. As best seen in FIG. 5, chamber 62 is used to locate and retain a spring 64 between button 60 and lower section 18. Spring 64 operates to bias arm 56 upwardly, the importance of which is described below. As best seen in FIG. 10, on the upper surface of button 60, a hollow 66 is presented to assist the user in comfortably depressing arm 56. Also on the upper surface of button 60 is an arcuate retaining ridge 68 and a pawl surface 70. Both ridge 68 and pawl surface 70 are distal from hollow 66. Ridge 68 is arcuate in shape and is formed by a vertical wall terminating at the upper-most surface of button 60. As best seen in FIG. 10, pawl surface 70 is a series of ridges, extending from ridge 68 to the end of button 60, and is located below the upper-most surface of button 60.

The exterior portion of upper section 26 includes an elevated shoulder 72 that defines a receiving slot 74. Slot 74 is generally c-shaped and has a generally semi-circular portion and an extending portion which is tapered outwardly. The outward taper is used to guide bracket 16 into place, as is more fully described below. As best seen in FIG. 10, shoulder 72 extends outwardly over slot 74 and defines a receiving channel that is shaped as is slot 74.

In assembling base 14, locking tab 24 is placed on lower section 18 and within arcuate retaining walls 50 of upper section 26. Tab 24 is located such that detent 52 is within one of the depressions 40, with handle 28 protruding from upper section 26 through first gap 42. Locking arm 56 is secured to upper section 26 and spring 64 is placed within chamber 62 to bias arm 56 upwardly. Upper section 26 and lower section 18 are then secured together by placing screws 48 through lower section 18 and threading them into columns 46. With this construction, tab 24 may be rotated between two positions, and held in one of two positions by locating detent 52 within one of the two depressions 40. When rotating tab 24 between the two positions, detent 52 slides along the thin portion of wall 38 and forces it slightly inwardly, due to an inward bias of detent 52. In one position, slot 34 is placed in alignment with the elongated portion of arm 56. In this position, arm 56 can be moved downwardly by depressing button 60. Button 60 is allowed enough clearance to place retaining ridge 68 below the adjacent surface of upper section 26. In the other position, slot 34 is oriented at an angle relative to the elongated portion of arm 56. In this position, arm 56 and button 60 are prevented from moving downwardly. If button 60 is pressed when locking tab 24 is in this position, arm 56 is prevented from downward movement by key section 30, because slot 34 is not aligned with arm 56. In this position, retaining ridge 68 and pawl surface 70 are both positively held above the adjacent surface of upper section 26.

Figure 6:
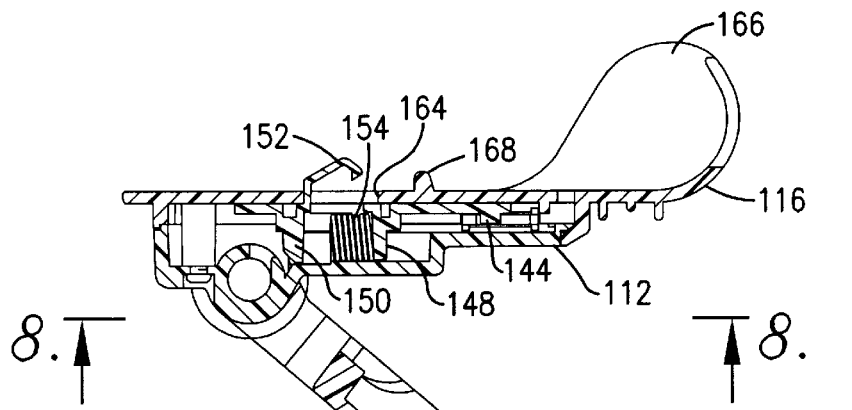
FIG. 6 is a view similar to FIG. 5 shown without the electronic device.
Figure 9:
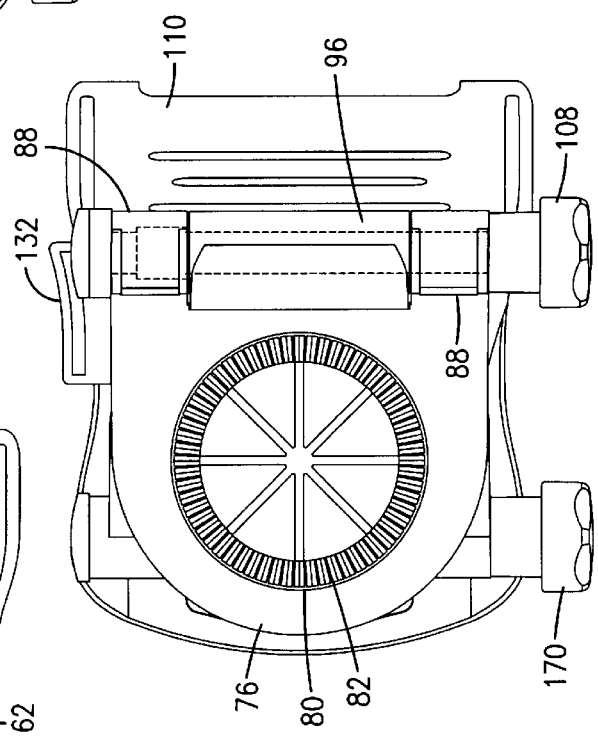
FIG. 9 is a view taken along line 9—9 of FIG. 6.
Figure 13:
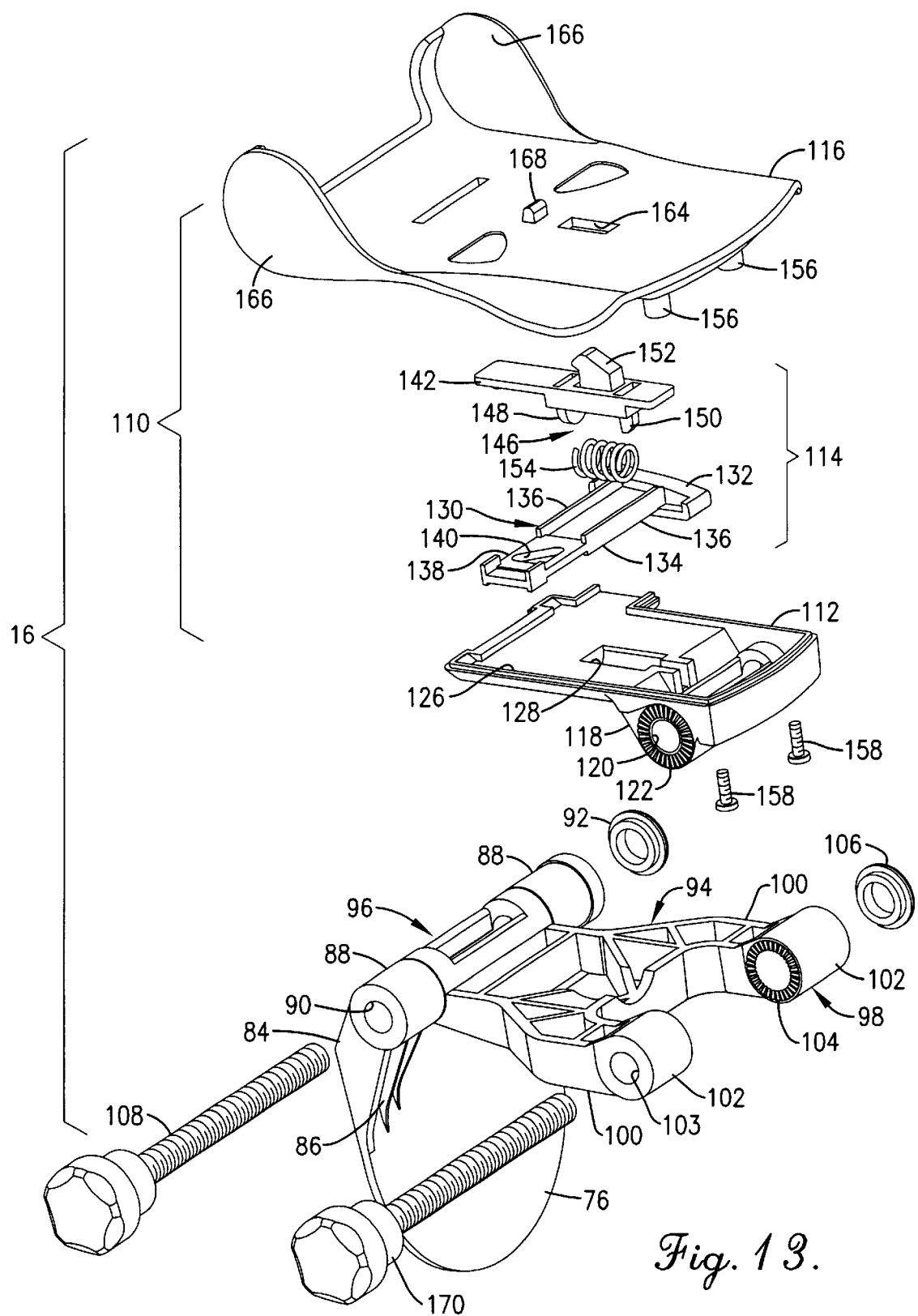
FIG. 13 is an exploded view of the mounting bracket of the present invention.

Base 14 is used to secure electronic device 12 in place on a surface, in cooperation with bracket 16. As best seen in FIGS. 5, 6 and 13, bracket 16 includes a support 76 which is preferably made from a molded plastic. Support 76 has a pedestal 78 extending downwardly therefrom. As best seen in FIGS. 5 and 9, pedestal 78 is preferably cylindrical and includes a platform 80. Platform 80 has a slightly larger radius than the adjacent portion of pedestal 78. Further, platform 80 has a lower ratchet surface 82, as best seen in FIG. 9. As is more fully described below, pedestal 78 and platform 80 are placed within slot 74 of base 14. In this orientation, a portion of ratchet surface 82 engages pawl surface 70 of locking arm 56.

Support 76 further has a pair of outer legs 84 and a number of braces 86 extending from its upper surface. At the outer most end of legs 84 and braces 86 are a pair of pivot bushings 88. As best seen in FIG. 13, pivot bushings 88 are arranged so that a gap extends therebetween. Preferably, bushings 88 are integrally formed with legs 84 and braces 86 to be an integral part of support 76. Extending through both bushings 88 is a hole 90. Both bushings 88 are therefore similar in many respects. However, a threaded insert is inserted in the outer end of one pivot bushing 88. The insert is threaded to receive the threaded end of a pivot rod, as is more fully described below. An end cap 92 is inserted into this pivot bushing 88 to hide the threaded insert from view. Surrounding hole 90 on the surface of bushings 88 nearest the gap between the bushings is an annular toothed surface (not shown).

Bracket 16 further includes a pivot link 94. As best seen in FIG. 13, link 94 is preferably generally Y-shaped. Link 94 has a first end 96 that is approximately the same width as the gap between bushings 88. End 96 has a hole extending therethrough that can be placed in alignment with hole 90. Surrounding the hole on each outer side of end 96 is an annular toothed surface. This toothed surface is preferably of the same diameter as the toothed surface surrounding hole 90 and is formed to engage and interlock therewith.

Link 94 has a second end 98 that is equipped with a pair of upwardly extending arms 100 that form a gap or opening extending between the two arms. Each arm 100 is equipped with a pivot bushing 102. Preferably, bushings 102 are integrally formed with link 94. Each bushing 102 has a hole 103 extending therethrough. Further, each bushing 102 has an annular toothed surface 104 extending about hole 103 on the side of arm 100 adjacent the gap between the two arms. One bushing 102 has a threaded insert (not shown) press-fit therein, that allows a pivot rod to be secured therein, as is more fully described below. The bushing 102 having the threaded insert therein has an end cap 106 inserted into the outside thereof to hide the threaded insert from view.

Link 94 is pivotally coupled to support 76 by placing a pivot rod 108 through pivot bushings 88 and the hole in end 96. More specifically, rod 108 is threaded into the threaded insert in one bushing 88. When this is done, the toothed surfaces of bushings 88 will be engaged and held against the toothed surfaces surrounding the hole in end 96 of pivot link 94. This will prevent pivot link 94 from rotating with respect to support 76.

Figure 8:
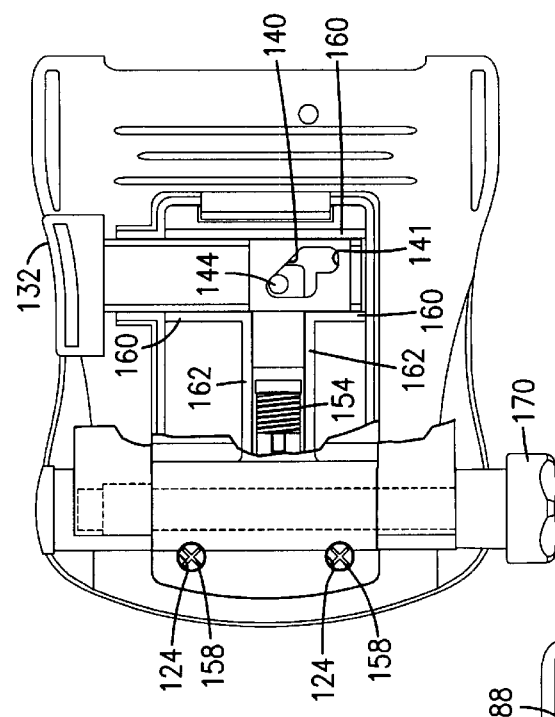
FIG. 8 is a view similar to FIG. 7 but taken along line 8—8 of FIG. 6 with lines being broken away to show particular details of construction.
Figure 7:
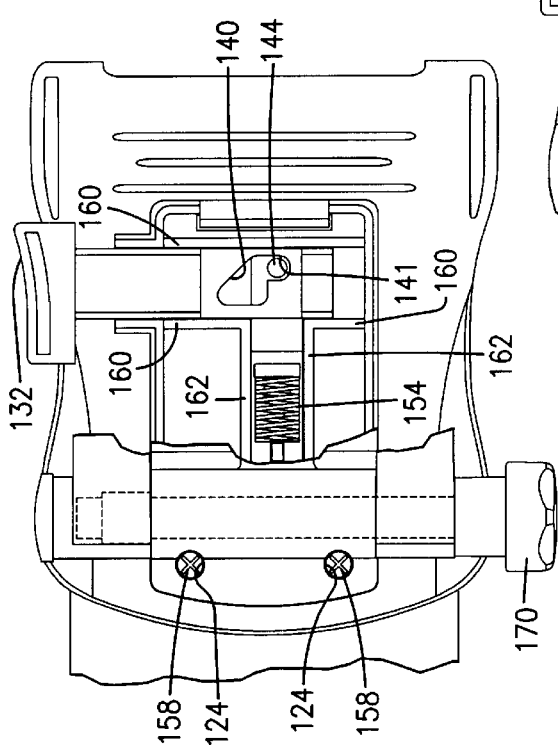
FIG. 7 is a partial view of the mounting apparatus taken along line 7—7 of FIG. 5, showing the latching mechanism with parts being broken away to show particular details of construction.

As best seen in FIG. 13, bracket 16 further includes a cradle 110 which is used to hold and receive the electronic device 12 and which is pivotally connected to second end 98 of link 94. Cradle 110 has a rear cover 112, a latch mechanism 114 and a front cover 116. Rear cover 112 includes a pair of integral pivot bushings 118 that extend away from the rear surface of cover 112. Extending through bushings 118 is a hole 120. Surrounding hole 120 on the outer surface of pivot bushings 118 is a toothed annular surface 122, which is formed to matingly connect with toothed surfaces 104. The distance between each toothed surface 122 is approximately equal to the gap formed between arms 100. As best seen in FIGS. 7 and 8, near pivot bushings 118 and extending through rear cover 112 are a pair of holes 124 which are used to couple rear cover 112 to front cover 116, as is more fully described below.

The unexposed or interior side of rear cover 112 is formed to have a latch chamber 126 and a spring receiving chamber 128, which accommodate latch mechanism 114. Latch mechanism 114 is located between rear cover 112 and front cover 116. Mechanism 114 includes a latch release 130 that is equipped with a push lever 132, that extends outwardly of the interior of covers 112 and 116. Extending from lever 132 into the interior of cradle 110 is an elongated portion 134 of release 130. Portion 134 includes a pair of slide rails 136, one surface of which rests upon and within latch chamber 126. Portion 134 also includes a camming area 138, extending through which is a camming opening 140. As best seen in FIGS. 7, 8 and 13, opening 140 is preferably triangular in shape and oriented so as to have a diagonal leg extending across portion 134. Opening 140 has a follower retaining notch 141 located therein which acts to positively retain a cam follower, as is described below. Release 130 is allowed to travel back and forth within chamber 126, sliding along rails 136.

Latch mechanism 114 further includes a device latch 142. Latch 142 has a cam follower 144 extending downwardly therefrom, as best seen in FIGS. 7 and 8. Preferably, follower 144 is cylindrically shaped and located to travel within camming opening 140. In the closed position, follower 144 is retained within notch 141, as shown in FIG. 7. Also located on the lower surface of latch 142 is a spring retainer 146. Retainer 146 includes a somewhat circular member 148 and a confining member 150. Members 148 and 150 are located a selected distance from one another so that they fit within spring receiving chamber 128. In use, latch 142 travels within latch chamber 126. More specifically, cam follower 144 is located within cam opening 140. Further, a spring 154 is placed within spring retainer 146 by locating it between members 148 and 150. Extending from the upper surface of latch 142 is a catch 152 that is shaped to engage electronic device 12 and hold device 12 against and within cradle 110.

With latch mechanism 114 within latch chamber 126, rear cover 112 is secured to front cover 116. As best in FIG. 13, cover 116 has a pair of threaded columns 156 which are located to align with holes 124. To secure rear cover 112 to front cover 116 a pair of screws 158 are threaded into columns 156 after being placed through holes 124. Front cover 116 has extending from its lower surface a latch chamber that aligns with chamber 126 and is used to contain and guide latch mechanism 114. More specifically, as best seen in FIGS. 7 and 8, the latch chamber is provided a pair of latch guide rails 160 and a pair of release guide rails 162. Latch release 130 travels within rails 160 and latch 142 travels within rails 162. Extending through front cover 116 is a catch opening 164. Opening 164 is located to align with catch 152 of device latch 142. Opening 164 is sized to be larger than catch 152 to allow catch 152 to travel longitudinally along opening 164.

The upper surface of front cover 116 is shaped to receive the electronic device 12. Device 12 can be coupled to cradle 110 with latch mechanism 114. More specifically, the upper surface of front cover 116 has a pair of retaining ears 166 which cooperate with latch mechanism 114 to retain electronic device 12 within cradle 110. Attached to the upper surface of front cover 116 adjacent catch opening 164 is a biasing mechanism 168. Preferably, mechanism 168 is made from a resilient sponge rubber material which acts to exert an outward force on electronic device 12 after it has been placed in cradle 110.

Cradle 110 is held within mounting bracket 16 by placing a pivot rod 170 through holes 103 of pivot bushings 102 and hole 120 on rear cover 112. In this orientation, toothed surface 122 aligns with toothed surfaces 104. Pivot rod 170 may be equipped with a knob on one end and has a threaded end which can be inserted into and threaded into the threaded insert in one bushing 102. When the knob of rod 170 is fully tightened so that the threaded end is fully received within the threaded insert, surfaces 104 interlock with toothed surfaces 122, preventing cradle 110 from moving with respect to pivot link 94.

In use, electronic device 12 is placed within bracket 16 by coupling the device within cradle 110. More specifically, catch 152 is placed within a receiving chamber on device 12. Catch 152 is able to travel longitudinally within catch opening 164. Catch 152 is cammed in one direction, against the bias of spring 154, upon placing device 12 within cradle 110. Once the catch is within the receiving chamber of device 12, it is moved by spring 154 into a holding relationship with device 12. To release device 12 from cradle 110, latch release 130 is pushed inwardly by pushing on push lever 132. This motion forces cam follower 144 to travel along the diagonal surface of camming opening 140, which in turn forces latch 142 into a position which allows removal of the device. Apparatus 10 therefore allows the device to be quickly and easily removed from base 14 with one hand by depressing push lever 132 and therefore maintains the portability of device 12. Device 12 therefore maintains portability, while allowing it to be mounted within a vehicle for optimal viewing.

To secure device 12 within a vehicle, the base 14 is first secured to the desired surface, such as a vehicle dash, by exposing an adhesive in the area of inset 22, or by placing an adhesive putty in the area of inset 22. To mount device 12 within base 14, locking tab 24 is moved to an open position, such that slot 34 is aligned with the elongated portion of locking arm 56. Pedestal 78 is then located within the base. More specifically, platform 80 is guided within the receiving channel of upper section 26, being guided along slot 74. Because locking tab 24 is in the open position, locking arm 56 is free to move downwardly. Thus, as platform 80 is placed on upper section 26, it can depress locking arm 56 and platform 80 can be moved into slot 74.

When platform 80 is moved completely within slot 74, its outer perimeter will clear button 60 up to retaining ridge 68. Spring 64 will then act to move locking arm 56 upwardly and pawl surface 70 will be placed in engagement with ratchet surface 82 of platform 80. Retaining ridge 68 will then be in engagement with the outer perimeter of platform 80. In this orientation, bracket 16 and device 12 are prevented from moving beyond base 14 by retaining ridge 68. In order to remove device 12 from base 14, button 60 of locking arm 56 must be depressed to release retaining ridge 68 from engagement with platform 80. Further, in this orientation, device 12 can be rotated with respect to base 14. In this rotation, enough rotational force must be applied to overcome the spring force acting upwardly on pawl surface 70. Device 12 may be placed in any of a number of discrete rotational locations, as shown in FIG. 4, as pawl surface 70 is located along lower ratchet surface 82. This rotational movement allows device 12 to be positioned for the driver or passenger of the vehicle, as desired.

Once device 12 has been rotated to the desired location, locking tab 24 can be rotated to a closed position. In this position, slot 34 is not aligned with the elongated portion of locking arm 56. Therefore, in this position, pawl surface 70 is positively held against ratchet surface 82. The engagement of pawl surface 70 and ratchet surface 82 prevents further rotation of device 12 with respect to base 14. Further, in this position, retaining ridge 68 is positively held against platform 80, holding device 12 within base 14.

Device 12 can be pivoted upwardly and downwardly through bracket 16, as well as inwardly and outwardly. More specifically, if it is desired to reposition device 12, pivot rods 108 and 170 can be loosened. This allows cradle 110 to be pivoted with respect to link 94, and allows link 94 to be pivoted with respect to support 76, because the respective toothed surfaces are not held positively against one another. Such repositioning may be necessary, for example, depending on the slope of a vehicle's dashboard. Once cradle 110 and link 94 are moved into the desired orientation, pivot rods 108 and 170 can be tightened, securing device 12 and mounting bracket 16 in position by positively holding mating toothed surfaces against one another.

From the above movements, the viewing screen of device 12 can be optimally positioned for viewing by the user thereof. Apparatus 10 allows the device to be repositioned into a number of different orientations to optimize this viewing and allows the device to be secured in the desired orientation. As seen in FIG. 1, device 12 can be placed relatively close to and parallel with base 14. In this orientation, base 14, bracket 16 and electronic device 12 form a relatively compact assembly. As best seen in FIG. 2, device 12 can be raised to an angled position. This is accomplished by loosening rods 108 and 170. Pivot link 94 is therefore allowed to pivot about both rods into a desired orientation for electronic device 12. Thereafter, rods 108 and 170 can be tightened, thus securing the electronic device 12 in the desired orientation. Moreover, as best seen in FIG. 3, support 76 can be rotated to a different position from that shown in FIGS. 1 and 2. This is accomplished by releasing locking tab 24 which allows support 76 to pivot within base 14. FIG. 3 also shows a more fully extended orientation for bracket 16. Once in the desired orientation, rods 108 and 170 can be secured and locking tab 24 may be rotated to prevent support 76 from rotating out of position.

With reference now to FIGS. 14–18, an alternative embodiment of a support or base portion of the present invention is illustrated and described.

Figure 14:
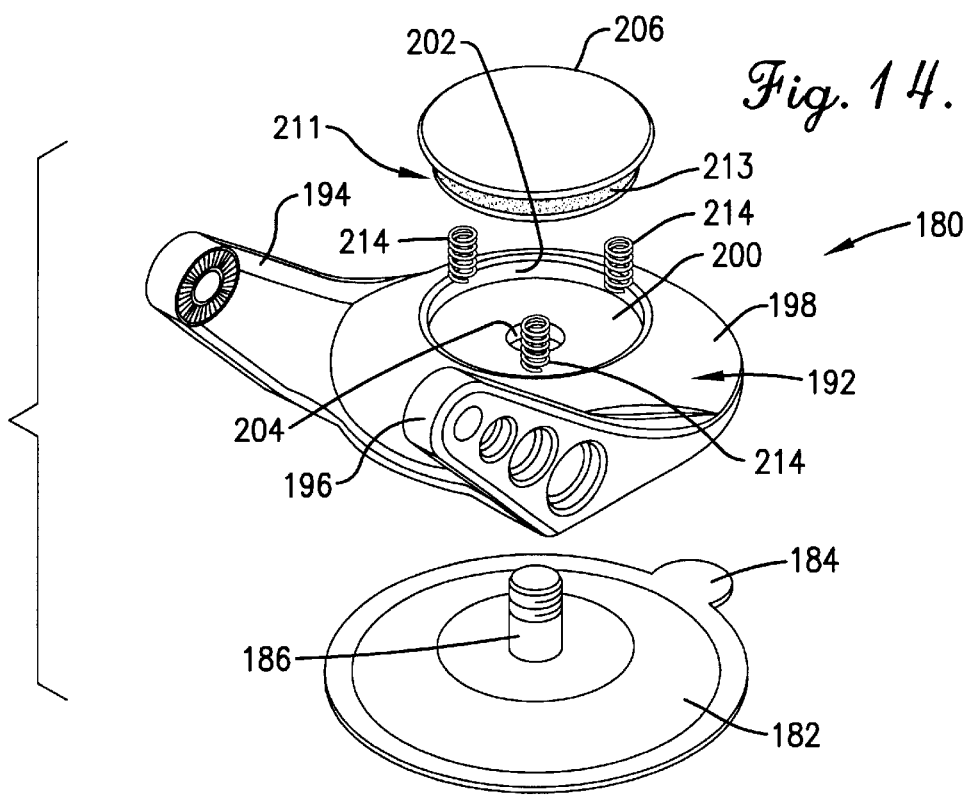
FIG. 14 is an exploded, perspective view of the alternative embodiment of the base portion of the mounting bracket of the present invention.

With reference to FIG. 14, a suction cup mount of the present invention is illustrated generally by reference numeral 810. Suction cup mount or support 180 has a flexible suction cup 182 having a tab 184 (for releasing the mount) at a peripheral edge thereof, as illustrated. Plunger 188 has a rigid post 186 (with threaded area 187) extending upwardly proximate the center location of the suction cup 182. In particular, with additional reference to FIGS. 17 and 18. Plunger 188 includes the upwardly extending post 186, as well as a lower plate 190. As illustrated, the plunger 188, and particularly the entirety of plate 190 of plunger 188 is molded within the flexible suction cup 182. In this regard, during construction of the suction cup 182, the plunger 188, preferably formed of rigid plastic or metal, is positioned within the mold such that the lower portion of the plunger 188, and particularly the plate 190, is potted within the flexible suction cup 182, which may be made of any suitable plastic or rubber material.

Suction cup mount 180 further includes a housing 192, preferably formed of rigid plastic. Housing 192 has a pair of arms 194, 196 extending upwardly and angularly outwardly from a main body portion 198 of the housing 192. The housing 192 further has a recessed area 200 at an upper portion of the housing 192. The recessed area 200 is defined by a peripheral wall 202. Additionally, the housing has an opening 204 located at a central position of the recessed area 200.

Suction cup mount 180 additionally includes a cap 206. With additional reference to FIGS. 17 and 18, the cap 206 is preferably constructed so as to have a domed top 208 and a downwardly depending portion 210, as illustrated. It should be understood that the cap 206 is intergrally formed of plastic. As illustrated, an upper dome portion 208 of cap 206 has an outer periphery 212 having a dimension that is greater than the dimension of the recessed area 200 in the housing 192. Additionally, the downwardly depending portion 210 of the cap preferably has a dimension so as to snugly or closely fit within the recessed area 200 of base 192, as illustrated in FIG. 17.

In accordance with an additional aspect of the invention, suction cup mount 180 employs one or more springs 214. Each spring 214 is positioned within a corresponding recess 216 beneath cap 206. As such, each spring 214 rests on an upper surface of the recessed area 200 of base 192, and also contacts an underside surface of the cap 206. The cap has a threaded socket on its underside proximate the center and is adapted for screwing onto the threads of a post 186.

In use, suction cup mount 180 is mounted to a surface. It will be understood that the surface to which the suction cup is mounted may be any desired surface, preferably is relatively smooth so as to obtain a secure vacuum mount with the surface. For example, the surface may be a dashboard or windshield or window within a vehicle. The linkage and cradle for holding an electronic device is pivotally coupled to the mount 180 in arms 194, 196 and corresponding openings on the linkage, by a pin (not shown) positioned through openings 191, 193. When the suction cup mount 180 is loosely resting on a surface (such as in FIG. 18), the cap 206 may be pressed downwardly to seat the suction cup on the surface, and effect the necessary vacuum mount. In particular, by placing manual pressure in a downward direction on cap 206, the plunger 188, which is attached to the cap 206, is forced downwardly. As will be understood, the post 186 of the plunger 188 moves downwardly through the opening 204 in the housing 192 of mount 180. Correspondingly, the suction cup 182, to which the plunger 188 is affixed, is pressed downwardly, and thereby seated on the surface, thereby creating a vacuum beneath the suction cup for holding the suction cup mount 180 to the surface. As the cap 206 is pressed downwardly for seating the suction cup mount 180, springs 214 are compressed from their outwardly biased position illustrated in FIG. 18, to their compressed position as illustrated in FIG. 17. Additionally, as illustrated in FIG. 17, which is an illustration of the suction cup mount 180 in its fully mounted position, the cap 206 is fitted within the recess 200, such that the downwardly depending periphery 210 (and particularly outer wall 211 thereof) of the cap is hidden from the view of a user by the peripheral wall 202 of the recessed area 200 of the housing 192. Additionally, a lowermost portion of the cap rests on the upper surface of recessed area 200, all as illustrated in FIG. 17.

Figure 16:
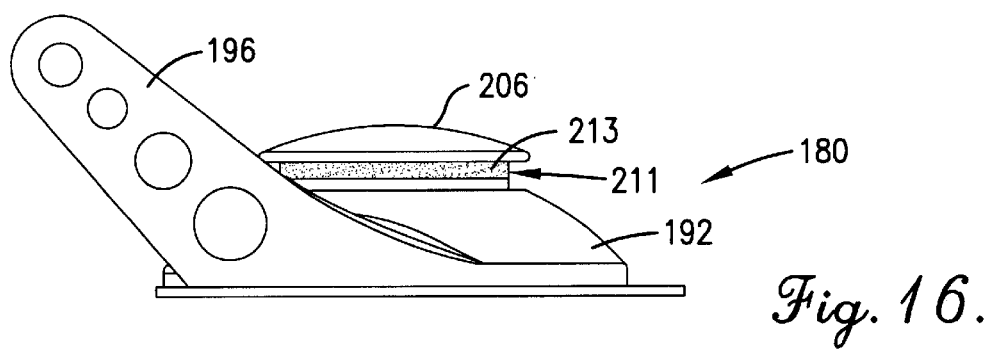
FIG. 16 is a side elevational view of the base portion of the alternative embodiment of the present invention in a position in which the suction cup thereof requires reseating.

In accordance with operation of the invention, as the suction cup 182 begins to loose its vacuum mount over time, the suction cup 182 will draw inwardly in a conventional fashion, thus causing the center of the suction cup 182 to raise upwardly, as illustrated in FIGS. 16 and 18. As this occurs, the plunger will correspondingly move upwardly, thereby raising the cap 206. As the cap 206 raises, the downwardly depending periphery 210 comes into view above the housing 192. In accordance with a particular aspect of the invention, the outer periphery wall 211 of the downwardly depending portion 210 is marked or colored 213 differently from the remainder of the mount 180, including the upper dome portion 208 of the cap, so as to be readily discernable to the user. In this regard, the visual indication of the cap moving upwardly indicates to a user that the suction cup needs to be reseated, and thus the user can again apply downward pressure to the cap 206 for reseating the suction cup 182. As illustrated in FIG. 18, upward motion of the suction cup 180, plunger 188, and cap 206 are restrained by the housing 192 once the vacuum releases a sufficient amount to cause the top of the suction cup 182 to abut up against a bottom surface of the housing 192.

Figure 15:
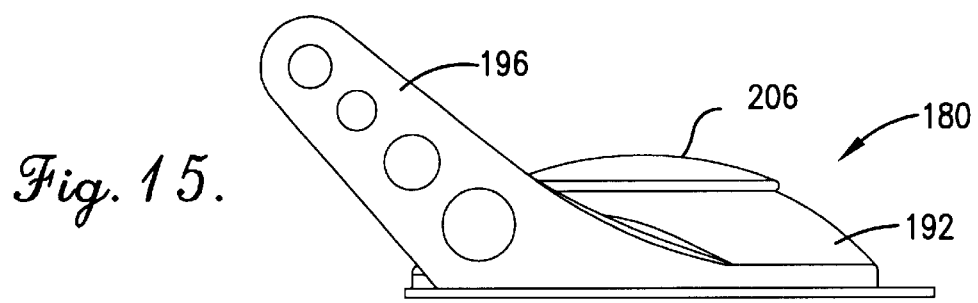
FIG. 15 is a side elevational view of the base portion of the alternative embodiment of the present invention, and the suction cup thereof is in a seated position.

In accordance with a particular aspect of the invention, with the suction cup 182 in its fully seated position, as illustrated in FIGS. 15 and 17, springs 214 are compressed and bias outwardly, thus applying upward pressure on cap 206. This upward pressure on cap 206 and correspondingly on plunger 188 of suction cup 182, assists in maintaining the vacuum mount effected by suction cup 182.

In accordance with an additional aspect of the invention, the upwardly and outwardly extending arms 194, 196 are positioned such that cap 206 is readily accessible to a user. In this regard, even with the mounting bracket 16, and corresponding linkage or assembly, connected to arms 194, 196, the mounting bracket may be moved away from a location in which it touching cap 206, or directly over cap 206, thus permitting the cap 206 to be readily accessible.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An apparatus for removably mounting an electronic device to a surface, said apparatus comprising:

a holder for holding said electronic device;

a mount, said mount having a suction cup and a movable cap positioned over said suction cup, wherein a sufficient downward pressure on said cap vacuum mounts said suction cup to said surface, said cap having a peripheral wall and an underside surface with a recess formed therein, said mount further including a biasing element seated within said recess of said cap for biasing said cap upwardly, wherein said biasing element is a spring and is fully hidden from view by said peripheral wall;

a housing for covering at least a portion of said suction cup, wherein said cap is located above said housing; and a plunger having a base attached with said suction cup and a post extending upwardly from said base and said suction cup, wherein said post extends through an opening in said housing and attaches with said cap, wherein upward movement of said suction cup causes corresponding upward movement of said cap, and wherein said peripheral wall of said cap is provided with a distinguishing marking, wherein said peripheral wall is concealed by said housing when said cap is pressed downwardly and said suction cup is mounted to surface, and wherein said peripheral wall is visible above said housing when said suction cup raises from a fully mounted position.

2. An apparatus for removably mounting an electronic device to a surface, said apparatus comprising:

a holder for holding said electronic device;

a mount, connected to said holder, said mount having a suction cup, a housing, and a movable cap, wherein said movable cap is operably connected with said suction cup, is positioned over said housing and has a peripheral wall and an underside surface with a recess formed therein, wherein pressing said cap downwardly correspondingly forces said suction cup into a vacuum mount to said surface; and at least one biasing element seated in said recess of said cap, fully hidden from view by said peripheral wall, and contacting said housing for biasing said cap upwardly, wherein said at least one biasing element compresses when said cap is pressed downwardly, and wherein said biasing of said cap upwardly assists in retaining said vacuum mount, wherein said element is a spring, wherein said peripheral wall of said cap is concealed by said housing when said suction cup is fully mounted onto said surface, and wherein said peripheral wall is visibly revealed when said suction cup loses its vacuum mount.

3. An apparatus for removably mounting an electronic device to a surface, said apparatus comprising:

a holder for holding said electronic device;

a mount, connected to said holder, said mount having a suction cup, a housing, and a movable cap, wherein said movable cap is operably connected with said suction cup, is positioned over said housing and has a peripheral wall and an underside surface with a recess formed therein, wherein pressing said cap downwardly correspondingly forces said suction cup into a vacuum mount to said surface; and at least one biasing element seated in said recess of said cap, fully hidden from view by said peripheral wall, and contacting said housing for biasing said cap upwardly, wherein said at least one biasing element compresses when said cap is pressed downwardly, and wherein said biasing of said cap upwardly assists in retaining said vacuum mount, wherein said element is a spring, wherein said peripheral wall of said cap is concealed by said housing when said suction cup is fully mounted onto said surface, and wherein said peripheral wall is visibly revealed when said suction cup loses its vacuum mount, and wherein as said suction cup loses its vacuum mount, said suction cup moves upwardly causing corresponding upward movement of said cap, thereby revealing said peripheral wall.

4. A mounting base for connecting to a holder of an electronic device, said mounting base comprising:

a suction cup;

a housing; and a cap positioned above said housing, wherein said suction cup is positioned below said housing, but said cap is operably connected to said suction cup such that downward pressure on said cap moves said suction cup into a vacuum mount on a surface, said cap having an underside surface with a recess formed therein, said mount further including a biasing element seated within said recess for biasing said cap upwardly, wherein said housing has a recessed area at a top portion thereof, and wherein said cap has a top portion and a downwardly depending portion, said downwardly depending portion adapted to be received within said recessed area of said housing, such that said downwardly depending portion of said cap is concealed by said housing when said cap is placed in a fully downward position, and wherein biasing element is fully hidden from view by said downwardly depending portion.

5. A mounting base for connecting to a holder of an electronic device, said mounting base comprising:

a suction cup;

a housing; and a cap positioned above said housing, wherein said suction cup is positioned below said housing, but said cap is operably connected to said suction cup such that downward pressure on said cap moves said suction cup into a vacuum mount on a surface, said cap having an underside surface with a recess formed therein, said mount further including a biasing element seated within said recess for biasing said cap upwardly, wherein said housing has a recessed area at a top portion thereof, and wherein said cap has a top portion and a downwardly depending portion, said downwardly depending portion adapted to be received within said recessed area of said housing, such that said downwardly depending portion of said cap is concealed by said housing when said cap is placed in a fully downward position, and wherein said downwardly depending portion is revealed above said housing when said cap rises upwardly and when said suction cup loses a vacuum grip with a surface, and wherein said biasing element is fully hidden from view by said downwardly depending portion.

6. A mounting base for connecting to a holder of an electronic device, said mounting base comprising:

a suction cup;

a housing;

a cradle adapted to be secured to the electronic device;

an articulating, moveable linkage having at least two pivot points and connected between said cradle and said housing, said housing having a pair of arms pivotally connected to said linkage; and a cap positioned above said housing, wherein said suction cup is positioned below said housing, but said cap is operably connected to said suction cup such that downward pressure on said cap moves said suction cup into a vacuum mount on a surface, said cap having an underside surface with a recess formed therein, said mount further including a biasing element seated within said recess for biasing said cap upwardly, wherein said housing has a recessed area at a top portion thereof, and wherein said cap has a top portion and a downwardly depending portion, said downwardly depending portion adapted to be received within said recessed area of said housing, such that said downwardly depending portion of said cap is concealed by said housing when said cap is placed in a fully downward position, and wherein said biasing element is fully hidden from view by said downwardly depending portion.

7. An apparatus for removably mounting an electronic device to a surface, said apparatus comprising:

a holder for holding said electronic device; and a mount, connected to said holder and including
  a suction cup,
  a housing,
  a movable cap operably connected with said suction cup and positioned over said housing, said cap having an underside surface with a recess formed therein, wherein pressing said cap downwardly correspondingly forces said suction cup into a vacuum mount to said surface, wherein said cap has a peripheral wall with a distinguishing marking, wherein said peripheral wall is concealed by said housing when said cap is pressed downwardly and said suction cup is mounted to a surface, and wherein said peripheral wall is visible above said housing when said suction cup raises from a fully mounted position, and
  a biasing element seated within said recess of said cap and contacting said housing for biasing said cap upwardly, said biasing element being hidden from view by said peripheral wall so as not to block viewing of said distinguishing marking on said peripheral wall.

* * * * *

UNITED STATES PATENT AND TRADEMARK OFFICE
CERTIFICATE OF CORRECTION

PATENT NO. : 6,663,064 B1  Page 1 of 1
APPLICATION NO. : 09/840949
DATED : December 16, 2003
INVENTOR(S) : Jeffrey D. Minelli et al.

It is certified that error appears in the above-identified patent and that said Letters Patent is hereby corrected as shown below:

On the Title Page
Item [63], Related U.S. Application Data is corrected to read:
--Continuation of Serial No. 09/452,409, filed December 1, 1999, now Patent No. 6,464,185, which is a continuation of Serial No. 09/208,348, filed December 9, 1998, now Patent No. 6,173,933 and a continuation-in-part of Serial No. 09/192,919, filed November 16, 1998, now Patent No. 6,129,321.--

Signed and Sealed this

Fifteenth Day of January, 2008

JON W. DUDAS
*Director of the United States Patent and Trademark Office*